United States Patent
Thiagarajan et al.

(10) Patent No.: US 11,097,507 B2
(45) Date of Patent: Aug. 24, 2021

(54) FOAM STIFFENED STRUCTURE AND METHOD OF MAKING THE SAME

(71) Applicant: TEXTRON INNOVATIONS INC., Providence, RI (US)

(72) Inventors: Ramesh Thiagarajan, Plano, TX (US); Suvankar Mishra, Carrollton, TX (US); Mark Chris, Dallas, TX (US); William Evans, III, Hurst, TX (US); Mike Mikel, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 236 days.

(21) Appl. No.: 15/195,501

(22) Filed: Jun. 28, 2016

(65) Prior Publication Data
US 2016/0303818 A1 Oct. 20, 2016

Related U.S. Application Data

(63) Continuation of application No. 13/224,532, filed on Sep. 2, 2011, now abandoned.
(Continued)

(51) Int. Cl.
*B32B 3/08* (2006.01)
*B29C 44/04* (2006.01)
(Continued)

(52) U.S. Cl.
CPC ............ *B32B 3/08* (2013.01); *B29C 44/025* (2013.01); *B29C 44/0415* (2013.01);
(Continued)

(58) Field of Classification Search
CPC ...... B32B 3/08; B29C 44/025; B29C 44/0415
See application file for complete search history.

(56) References Cited

U.S. PATENT DOCUMENTS

| 3,258,861 A | 7/1966 | Niconchuk |
| 3,873,654 A | 3/1975 | Smith |

(Continued)

FOREIGN PATENT DOCUMENTS

| DE | 2117070 A1 * | 10/1972 | ........... A47B 96/201 |
| EP | 0671250 A1 | 9/1995 | |

(Continued)

OTHER PUBLICATIONS

English Abstract of DE 211070, see above for date and inventor.*
(Continued)

*Primary Examiner* — Hai Vo
(74) *Attorney, Agent, or Firm* — James E. Walton

(57) ABSTRACT

A structure includes a skin and a foam member. The foam member has a molded contour, the mold contour being configured to provide tooled surface for the skin. When the skin is a composite skin, the foam member provides support for the skin so that the skin can be cured under heat and pressure. A method of making the foam member for a foam stiffened structure includes creating a mold having an interior cavity which resembles a desired shape the foam member. A subsequent step involves introducing a foam mixture into the mold. Next, the foam mixture is allowed to polymerize so as to expand and distribute within the cavity of the mold. The method further includes selectively controlling a density of the foam member in the mold. The foam member is at least partially cured. The foam member is assembled with a skin to produce the foam stiffened structure.

4 Claims, 10 Drawing Sheets

Related U.S. Application Data

(60) Provisional application No. 61/410,458, filed on Nov. 5, 2010.

(51) Int. Cl.

| | |
|---|---|
| *B29C 44/08* | (2006.01) |
| *B29C 44/10* | (2006.01) |
| *B64C 3/24* | (2006.01) |
| *B32B 1/00* | (2006.01) |
| *B64C 3/20* | (2006.01) |
| *B32B 5/26* | (2006.01) |
| *B32B 5/28* | (2006.01) |
| *B64C 1/06* | (2006.01) |
| *B29C 44/02* | (2006.01) |
| *B32B 7/12* | (2006.01) |
| *B32B 5/24* | (2006.01) |
| *B32B 7/06* | (2019.01) |
| *B29C 44/58* | (2006.01) |
| *B29C 44/60* | (2006.01) |
| *B32B 5/18* | (2006.01) |
| *B64C 5/10* | (2006.01) |
| *B64C 1/00* | (2006.01) |
| *B64C 27/473* | (2006.01) |
| *B29K 75/00* | (2006.01) |
| *B29K 105/04* | (2006.01) |
| *B29L 31/30* | (2006.01) |

(52) U.S. Cl.
CPC ............ *B29C 44/086* (2013.01); *B29C 44/10* (2013.01); *B29C 44/588* (2013.01); *B29C 44/60* (2013.01); *B32B 1/00* (2013.01); *B32B 5/18* (2013.01); *B32B 5/245* (2013.01); *B32B 5/26* (2013.01); *B32B 5/28* (2013.01); *B32B 7/06* (2013.01); *B32B 7/12* (2013.01); *B64C 1/068* (2013.01); *B64C 3/20* (2013.01); *B64C 3/24* (2013.01); *B64C 5/10* (2013.01); *B29K 2075/00* (2013.01); *B29K 2105/04* (2013.01); *B29L 2031/3076* (2013.01); *B32B 2250/03* (2013.01); *B32B 2250/40* (2013.01); *B32B 2260/023* (2013.01); *B32B 2260/046* (2013.01); *B32B 2266/0278* (2013.01); *B32B 2305/022* (2013.01); *B32B 2305/076* (2013.01); *B32B 2305/10* (2013.01); *B32B 2603/00* (2013.01); *B32B 2605/18* (2013.01); *B64C 2001/0072* (2013.01); *B64C 2027/4736* (2013.01); *Y02T 50/40* (2013.01); *Y10T 156/10* (2015.01); *Y10T 428/233* (2015.01); *Y10T 428/249953* (2015.04); *Y10T 428/249982* (2015.04)

(56) References Cited

U.S. PATENT DOCUMENTS

| | | | |
|---|---|---|---|
| 3,960,631 A | | 6/1976 | Weiss et al. |
| 4,181,287 A | | 1/1980 | Richter et al. |
| 4,671,471 A | | 6/1987 | Patmont |
| 4,687,691 A | | 8/1987 | Kay |
| 4,828,325 A | | 5/1989 | Brooks |
| 5,042,968 A | | 8/1991 | Fecto |
| 5,096,384 A | | 3/1992 | Immell et al. |
| 5,112,663 A | | 5/1992 | Morenz et al. |
| 5,773,121 A | | 6/1998 | Meteer et al. |
| 6,050,523 A | * | 4/2000 | Kraenzien ............... B64C 21/06 244/123.1 |
| 6,630,093 B1 | | 10/2003 | Jones |
| 2003/0052510 A1 | | 3/2003 | Schonenbach et al. |
| 2003/0061663 A1 | | 4/2003 | Lampel |
| 2004/0043181 A1 | | 3/2004 | Sherwood |
| 2009/0220347 A1 | | 9/2009 | Ball et al. |
| 2010/0129589 A1 | | 5/2010 | Senibi et al. |
| 2010/0180439 A1 | * | 7/2010 | Garcia Castro ....... B29C 70/865 29/889.71 |
| 2011/0293914 A1 | * | 12/2011 | Maurer ................ B29C 44/569 428/304.4 |

FOREIGN PATENT DOCUMENTS

| | | |
|---|---|---|
| EP | 1273418 A2 | 1/2003 |
| EP | 1582328 A1 | 10/2005 |
| EP | 2256034 A1 | 12/2010 |
| GB | 1040948 | 9/1966 |
| GB | 2120621 A | 12/1983 |

OTHER PUBLICATIONS

Translation of DE 2117070. See PTO-892 mailed Feb. 14, 2019 for date and inventor.*
Search Report dated Dec. 2, 2014 from counterpart EP App. No. 14164626.5.
"Moldless Composite Homebuilt Sandwich Aircraft Construction 3rd Edition",Sep. 1, 1983 (Sep. 1, 1983), pp. 1-3-21, XP055083730, Mojave, CA 93501, USA. Retrieved from the Internet:URL:http://www.prototechnical.com/~imcmahon/Aircraft_Manuals/MCHSAC.pdf, retrieved on Dec. 19, 2014.
Office Action dated Oct. 30, 2014 from counterpart CN App. No. 201180052594.5.
Office Action dated Jun. 15, 2015 from counterpart CN App. No. 201110364708.1.
Office Action dated Jul. 14, 2015 from related CN App. No. 201180052594.5.
Summons to Attend Oral Proceedings in related European patent application No. 11186041.7, 6 pages, mailed Oct. 30, 2013.
Extended European Search Report in Counterpart European Application No. 11186041.7 by European Patent Office dated Dec. 21, 2011, 10 pages.
Office Action dated Dec. 22, 2014 from counterpart CN App. No. 2011103647081.
Office Action dated Jan. 21, 2015 from counterpart EP App. No. 14164626.5.
Examination Report in related Indian patent application No. 3033/DEL/2011, dated Jun. 11, 2018.
Office Action dated Sep. 30, 2015 from related counterpart CA App. No. 2,814,980.
Examination Report dated Oct. 29, 2015 from related countpart EP App. No. 11838384.3.
European Office Action in related European patent application No. 11186041.7, 5 pages, dated Jan. 29, 2013.
Communication in related European patent application No. 118383984.3, 4 pages, dated May 11, 2016.
Minutes of Oral Proceedings in related European patent application No. 11186041.7, 4 pages, mailed Feb. 14, 2014.
Decision from Oral Proceedings in related European patent application No. 11186041.7, 20 pages, mailed Feb. 14, 2014.
Office Action dated Jan. 25, 2015 from counterpart CA App. No. 2,814,980.
International Search Report and the Written Opinion of the International Searching Authority mailed by ISA/USA, U.S. Patent and Trademark Office dated Dec. 6, 2011 for International Patent Application No. PCT/US11/44241, 8 pages.
Office Action dated Mar. 16, 2015 from counterpart CA App. No. 2,756,119.
Office Action from corresponding application No. 2756119 issued from the Canadian Intellectual Property Office dated May 1, 2014.
Office Action from corresponding application No. 2011103647081 issued from the Chinese Patent Office dated May 29, 2014.
Office Action dated Dec. 16, 2015 from counterpart CN App. No. 201110364708.1.

* cited by examiner

FOAM STIFFENED STRUCTURE AND METHOD OF MAKING THE SAME

CROSS REFERENCE TO RELATED APPLICATIONS

This application is a continuation of U.S. application Ser. No. 13/224,532, filed 2 Sep. 2011, titled "Foam Stiffened Structure and Method of making the same", which claims the benefit of U.S. Provisional Application No. 61/410,458, filed 5 Nov. 2010, titled "Foam Stiffened Structure and Method of making the same," all of which are hereby incorporated by reference for all purposes as if fully set forth herein.

BACKGROUND

1. Field of the Invention

The system of the present application relates to a structure for a vehicle, such as a rotorcraft. In particular, the system of the present application relates to a foam stiffened structure and method of making the foam stiffened structure. The system of the present application can be applied to many different structures, both static and mobile. Furthermore, the system of the present application is described herein with regard to a rotorcraft structure for exemplary purposes.

2. Description of Related Art

One typical aerospace structural assembly includes an exterior aerodynamic skin with a plurality of internal structural members. Referring to FIG. 1, an exemplary prior art airfoil structure 101 is illustrated. Structure 101 includes a plurality of ribs 103 and spars 105. The ribs 103 and spars 105 are configured to provide structural integrity to structure 101, as well as to provide support to a skin 107 (shown partially removed for clarity). Structure 101 requires a substantial amount of expense and effort to assembly. For example, each rib 103 and spar 105 represents an individual part that must be fabricated, recorded, stocked, and assembled. Further, the ribs 103, spars 105, and skin 107 are typically assembled with fasteners, usually requiring a considerable amount of effort and expense to install. Moreover, the fasteners may promote corrosion, stress concentrations, and otherwise shorten the life of the structure. Further, tolerance variations between the plurality of parts can lead to irregularities in the surface quality of skin 107.

Although the developments in aerospace structures have produced significant improvements, considerable shortcomings remain.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
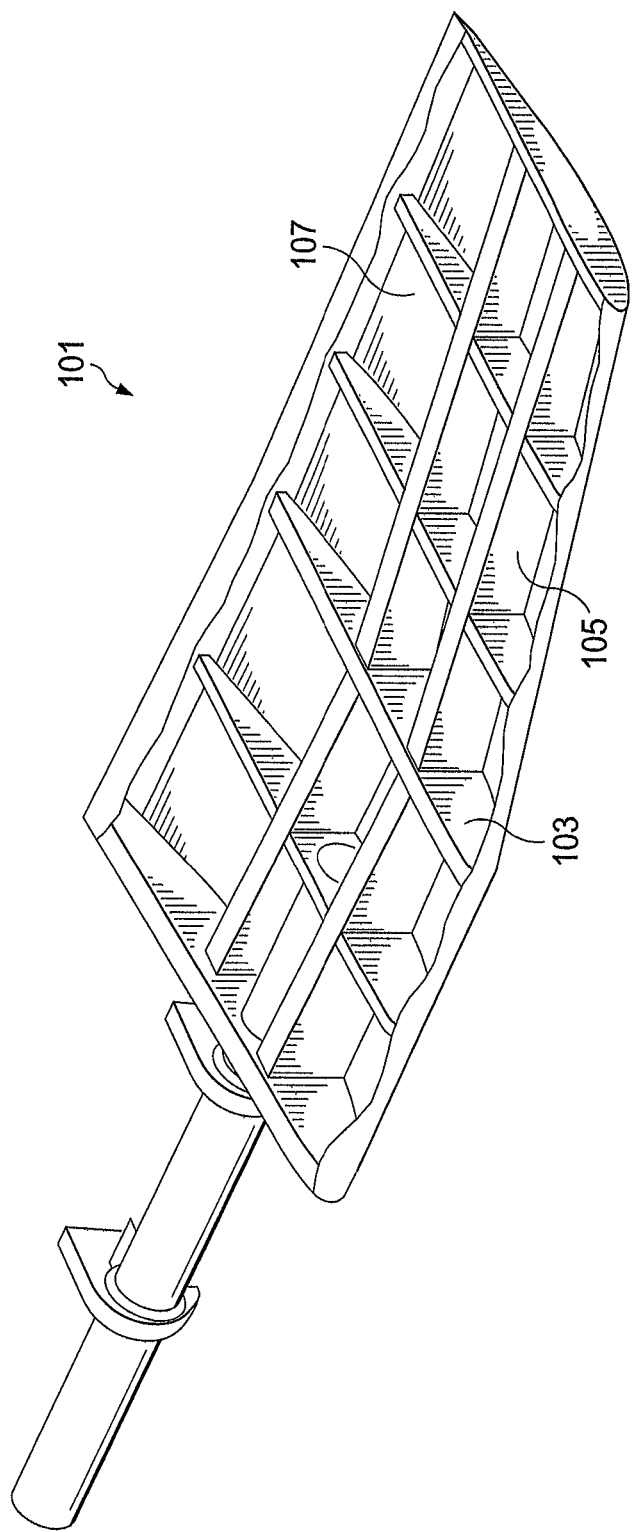
FIG. 1 is a perspective view of a prior art airfoil structure.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
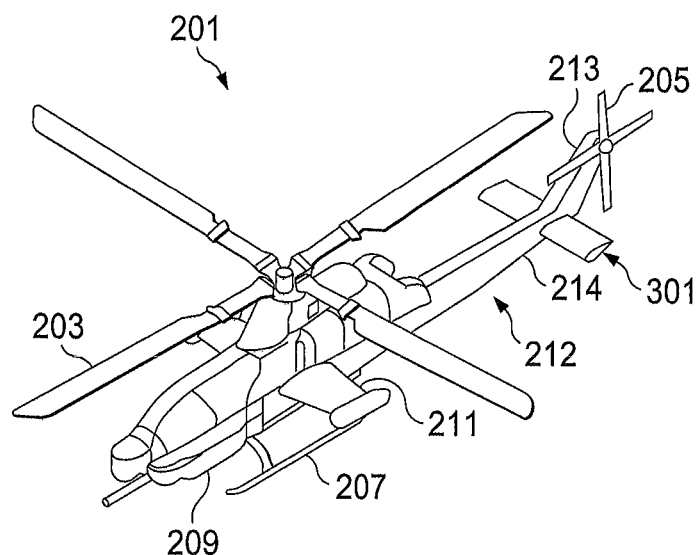
FIG. 2 is perspective view of an aircraft, according to the preferred embodiment of the present application.

Referring to FIG. 2, an aircraft 201 is illustrated. Aircraft 201 includes main rotor blades 203, a fuselage 209, a landing gear 207, and a wing 211. Aircraft 201 further includes a tail boom assembly 212, which is an assembly of a tail boom 214, a tail fin 213, an elevator 301, and tail rotor blades 205. Elevator 301 functions to provide pitch control during flight of aircraft 201. Elevator 301 is illustrated and described herein as an embodiment of a foam stiffened structure. Further, it should be appreciated that elevator 301 is simply one example of a foam stiffened structure that can be manufactured in accordance with the method of the present application. For example, a variety of structures on aircraft 201 may be manufactured in accordance with the method of the present application. For example, main rotor blade 203, tail rotor blade 205, wing 211, tail boom 214, tail fin 213, and fuselage 209 are all parts that may be manufactured in accordance with the method of the present application, so as to be stiffened by a molded foam member. Furthermore, aircraft 201 is merely exemplary of the wide variety of vehicles that may have foam stiffened structures formed from the method of the present application. For example, other exemplary vehicles may include fixed wing aircraft, boats, ships, automobiles, and skateboards, to name a few.

Figure 3:
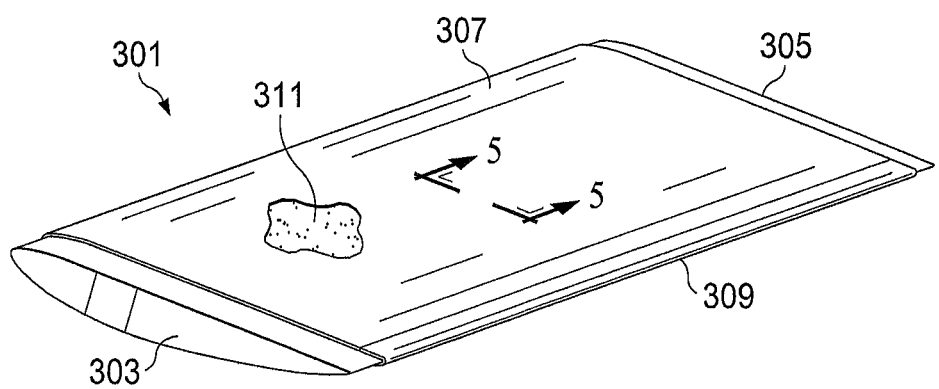
FIG. 3 is a perspective view of a foam stiffened structure, according to the preferred embodiment of the present application.
Figure 4:
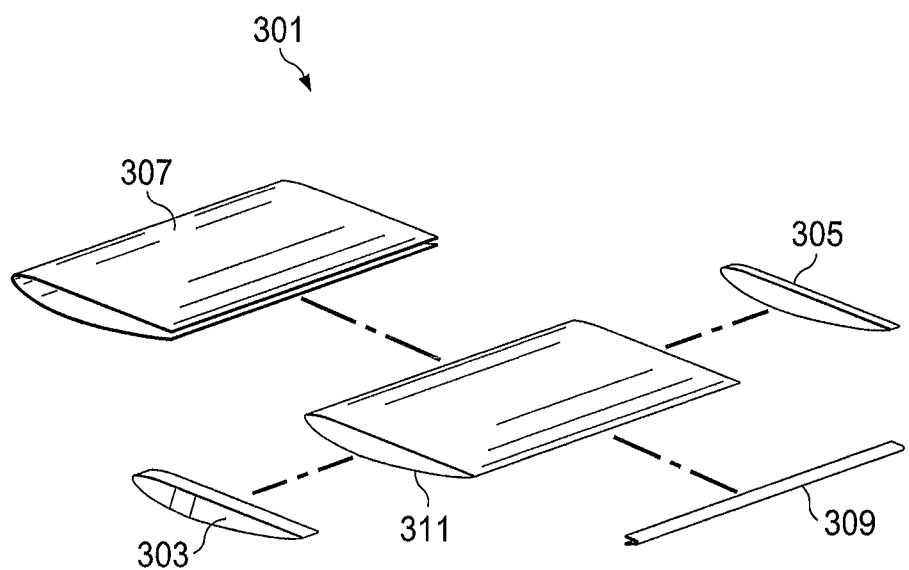
FIG. 4 is an exploded perspective view of a foam stiffened structure, according to the preferred embodiment of the present application.
Figure 5:
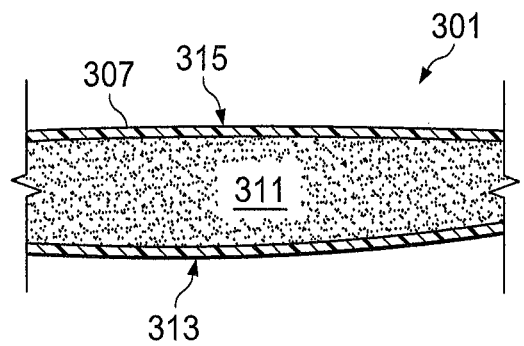
FIG. 5 is a cross-sectional view of the foam stiffened structure, according to the preferred embodiment of present application, taken along the section lines 5-5, shown in FIG. 3.

Referring now to FIGS. 3-5, a right hand side elevator 301 is illustrated. For clarity, the left hand side elevator is not shown, but in the illustrated embodiment, the left hand side elevator is a mirror image of the right hand side elevator 301. Elevator 301 includes a foam member 311 and a skin 307. In the preferred embodiment, foam member 311 is molded in a tool. In a subsequent operation, skin 307 is preferably formed by placing uncured composite material onto foam member 311, such that foam member 311 acts as a tooled surface for the composite material. The composite material is subsequently cured to become a rigid skin 307. In an alternative embodiment, skin 307 is formed on a unique tooled surface and then cured. In such an embodiment, foam member 311 is formed by using the skin 307 as a tool by allowing the foam to expand and form inside the skin 307, thereby allowing skin 307 to act as a tool for the foam. In another alternative embodiment, skin 307 is not formed from a composite material, but rather thin sheet metal, or other semi-rigid material. In such an embodiment, the thin sheet metal is formed and bonded to foam member 311, such that foam member 311 acts partly as tool by dictating final surface contour location of the sheet metal. In the illustrated embodiment, skin 307 includes an upper airfoil surface 315 and a lower airfoil surface 313.

Further, elevator 301 may include an inboard rib 303, an outboard rib 305, and a trailing edge member 309. Inboard rib 303, outboard rib 305, and trailing edge member 309 are exemplary of members that may be formed integrally with foam member 311, or assembled to foam member 311 in an assembly operation subsequent to the formation of foam member 311. Inboard rib 303, outboard rib 305, and trailing edge member 311 can be formed from any conventional manufacturing operation, such as machining, molding, casting, injection molding, compression molding, to name a few. Further, an adhesive can be used to promote a bond between any of the skin 307, foam member 311, inboard rib 303, outboard rib 305, and trailing edge member 309.

Foam member 311 provides structural stiffness to elevator 301. Skin 307 preferably comprise a plurality of reinforcing fibers disposed in a polymeric matrix. As discussed further herein, skin 307 is preferably placed onto foam member 311 as a plurality of uncured composite plies, and then later cured to form a rigid composite laminate. It should be appreciated that skin 307 can be formed from a variety of fiber and resin systems. It should also be appreciated that the specific composite material, or sheet metal, is implementation specific. For example, carbon fiber may be desirable in one application, while fiberglass fiber may be desirable in another application.

The molded foam member 311 is preferably formed with a pourable and expandable structural foam in a mold, as discussed further herein. The molded foam member 311 is configured to provide the structural integrity to elevator 301 in a wide variety of geometries and contours. Curing of skin 307 may require pressure, such as autoclave curing pressure, for proper curing. As such, foam member 311 is configured to provide structural resistance to the pressure so as to preserve the desired surface geometry of skin 307. Foam member 311 is configured to be isotropic, thus the isotropic properties of foam member 311 allow it to retain structural integrity in a wide variety of geometries and contours.

Figure 6A:
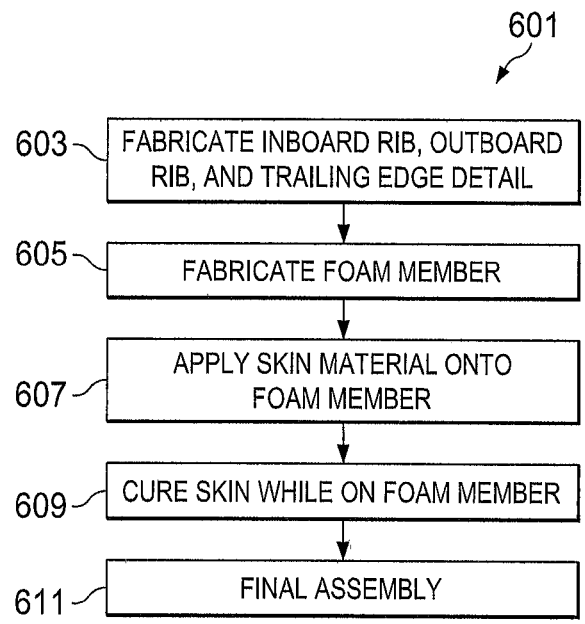
FIG. 6A is a schematic block diagram of a method for manufacturing a foam stiffened structure, according to the preferred embodiment of present application.

Referring now to FIG. 6A, a method 601 for manufacturing a foam stiffened structure, such as elevator 301, is schematically illustrated. A step 603 of method 601 includes fabricating inboard rib 303, outboard rib 305, and trailing edge member 309, which may be included in some embodiments of elevator 301. As discussed further herein, any of inboard rib 303, outboard rib 305, and trailing edge member 309 maybe located in the mold during the manufacturing of foam member 311.

Figure 6B:
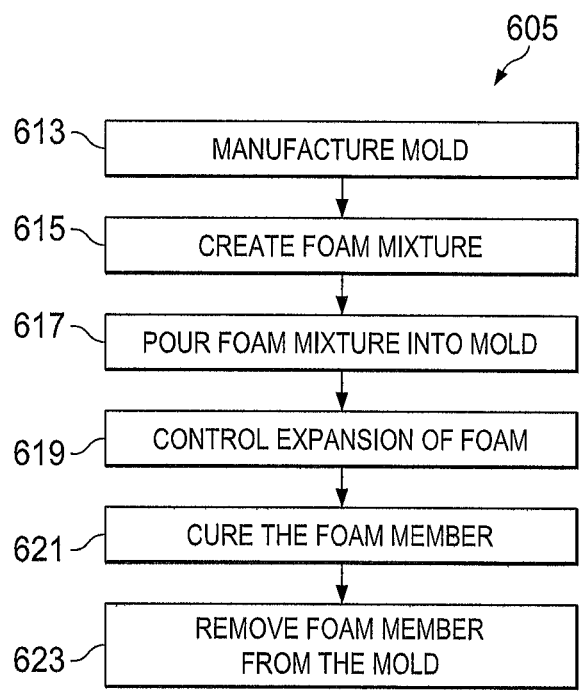
FIG. 6B is a schematic block diagram of a process of the method for manufacturing a foam stiffened structure, according to the preferred embodiment of present application.

A process 605 of method 601 includes fabricating foam member 311. Referring now also to FIG. 6B, process 605 is schematically illustrated in further detail. A step 613 of process 605 includes manufacturing a mold for which foam member 311 is formed within.

Figure 7A:
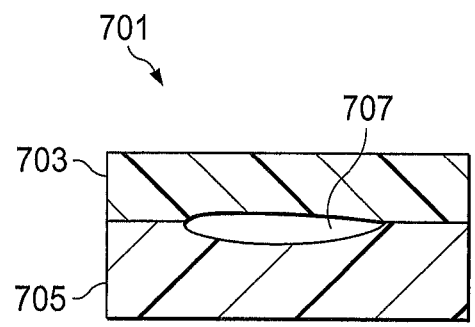
FIG. 7A is a top view of a mold for manufacturing a molded foam member, according to the preferred embodiment of present application.
Figure 7B:
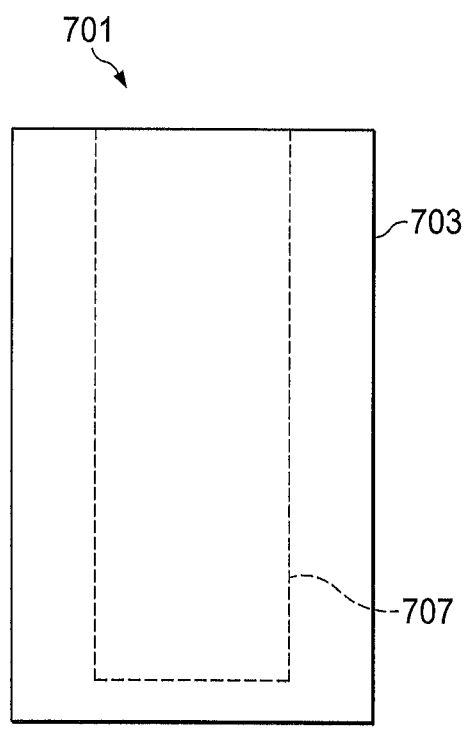
FIG. 7B is a front view of a mold for manufacturing a molded foam member, according to the preferred embodiment of present application.

Referring now also to FIGS. 7A and 7B, a mold 701 is illustrated. Mold 701 preferably includes a first member 701 and a second member 703. Mold 701 also includes a cavity 707 formed partly in each of the first member 701 and a second member 703. It should be appreciated that mold 701 may be divided up into any number of separate members. Cavity 707 represents the desired geometry of foam member 311. A release agent is preferably applied to the interior of cavity 707 in order to promote the release and removal of foam member 311 from the mold 701.

Figure 8:
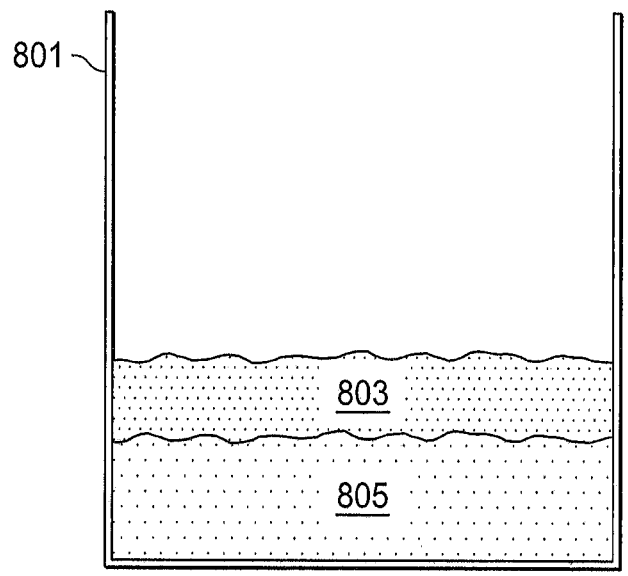
FIG. 8 is a schematic view of components of the foam system used to manufacture a molded foam member, according to the preferred embodiment of present application.
Figure 9:
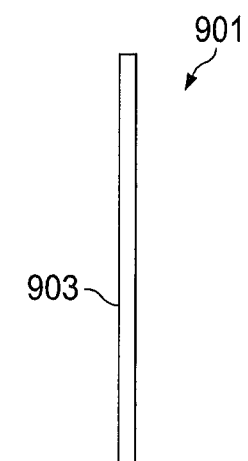
FIG. 9 is a perspective view of a mixer used to mix the foam system, according to the preferred embodiment of present application.
Figure 10:
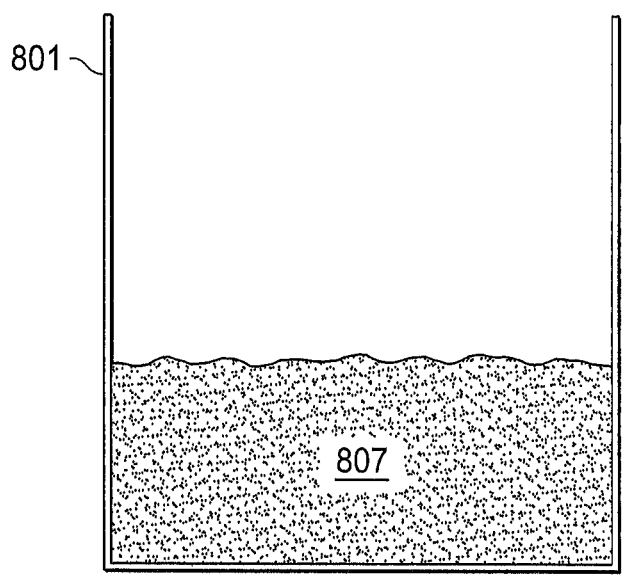
FIG. 10 is a schematic view of a mixture of the foam system used to manufacture a molded foam member, according to the preferred embodiment of present application.

A step 615 of process 605 includes creating a foam mixture 807. Referring now also to FIGS. 8-10, the foam system used in the creation of foam member 311 is preferably a urethane foam system that expands to fill cavity 707 of mold 701. Upon curing, the foam is preferably rigid and flexible, while having a relatively low density. The preferred foam system is a polyisocyanurate pour foam system marketed under the name of Stepanfoam BX 450, by the Stepan Chemical Company. It should be fully appreciated that other foam systems may be used in the molding of foam member 311. The Stepanfoam BX 450 includes two separate resin components, namely a resin T (70% by weight) 805 and a resin R (30% by weight) 803. The desired weight amounts of resin T 805 and resin R 803 are measured and poured into a container 801. The resin T 805 and resin R 803 are mechanically agitated to form a homogenous mixture 807. A mixer 901 is used in rotation in order to mix resin T 805 and resin R 803 to form mixture 807. Mixer 901 includes a shaft 903, the shaft 903 being configured to be driven by a drill motor, or the like. Mixer 901 may include a plurality of blades located on a first blade disc 905 and a second blade disc 907. In the preferred embodiment, mixer 901 is rotated at 3500 revolutions per minute for 10-15 seconds when mixing resin T 805 and resin R 803 to form mixture 807.

The total weight amount of mixture 807 is at least partially dependent upon the desired density and the volume of foam member 311. For example, because density is the relationship of mass per unit volume, the desired density of foam member 311 at least partially dictates the weight amount of mixture 807. However, a portion of the mixture 807 may escape from within cavity 707, which may affect the final density determination of foam member 311.

A step 617 of process 605 includes pouring foam mixture 807 into cavity 707. Once the mixing in step 615 is complete, it is preferred that mixture 807 is poured into cavity 707 mold 701 as quickly as possible.

Figure 11:
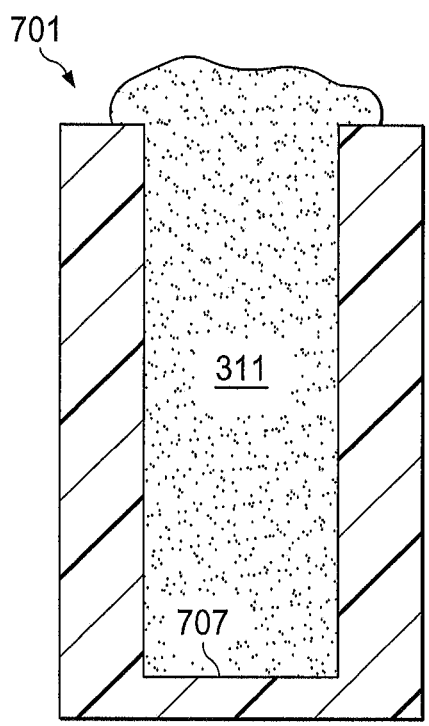
FIG. 11 is a cross-sectional view of an uncured foam member in a mold tool, according to an embodiment of present application.

A step 619 includes controlling expansion of foam mixture 807 in cavity 707. Referring to FIG. 11, one embodiment of step 619 is illustrated. As shown in FIG. 11, foam mixture 807 is allowed to "free rise" within cavity 707 so as to form foam member 311 at a "free rise" density. In the "free-rise" embodiment, a density of approximately 8.0 pounds/ft³ and less can be achieved. The "free rise" embodiment of foam member 311 may be particularly desirable when the geometry and contours of foam member 311 are relatively simple. This is because the exposed surface would require a cutting or shaving operation to trim the exposed surface of foam member 311 to the desired contour. As shown in FIG. 11, a "free rise" embodiment includes allowing foam mixture 807 to expand and polymerize without constraint. Expansion and polymerization of foam mixture 807 allows any volatiles to escape during the polymerization stage, and also to facilitate complete homogeneous fill of cavity 707. The polymerization stage is the expansion from a chemical reaction of the foam mixture 807.

Figure 12:
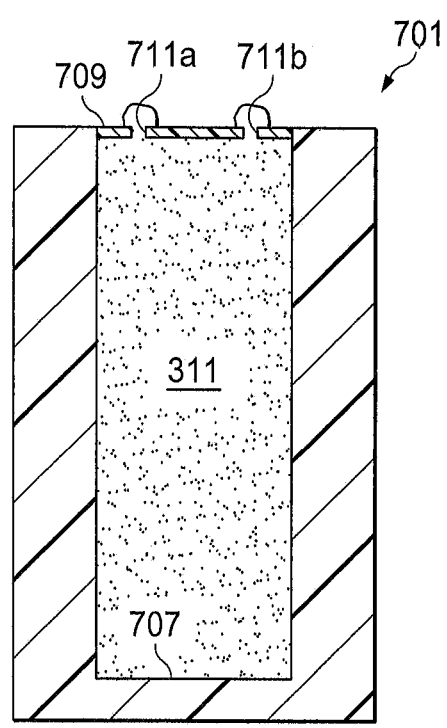
FIG. 12 is a cross-sectional view of an uncured foam member in a mold tool, according to another embodiment of present application.

Referring now also to FIG. 12, another embodiment of step 619 includes using a "captive process" to tailor the density of foam member 311. The captive process involves using a lid member 709 to generate pressure within cavity 707, thus inhibiting the expansion of foam mixture 807 during polymerization. Lid member 709 includes one or more openings 711a and 711b, which allow volatiles to escape during the polymerization of mixture 807. The size and number of openings 711a and 711b are also configured so as to selectively tailor the density of foam member 311. In one embodiment, the openings 711a and 711b in lid member 709 are sized to create a foam member 311 having a density of approximately 12-16 pounds/ft³. However, this size and quantity of openings 711a and 711b can be increased/decreased to produce a foam member 311 of lower/higher density, respectively. The expected operational loading of elevator 101 is a factor that may contribute to the customization of the density of foam member 311. The density of foam member 311 can be customized in accordance with the desired structural strength of foam member 311.

Figure 13A:
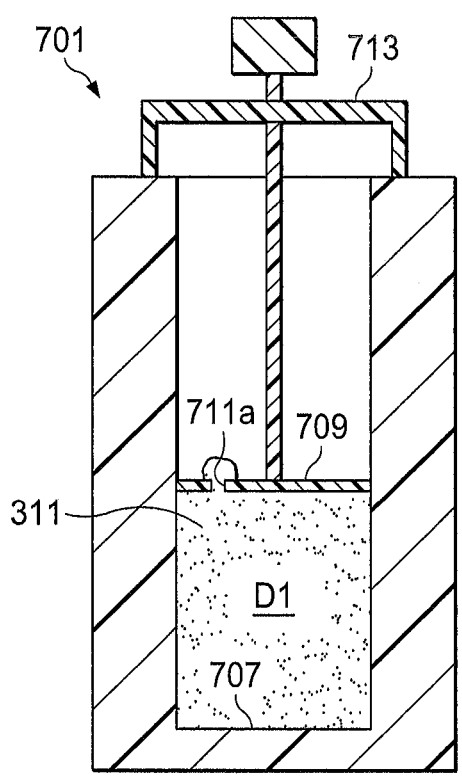
FIGS. 13A and 13B are cross-sectional views of an uncured foam member in a mold tool, according to another embodiment of present application.
Figure 13B:
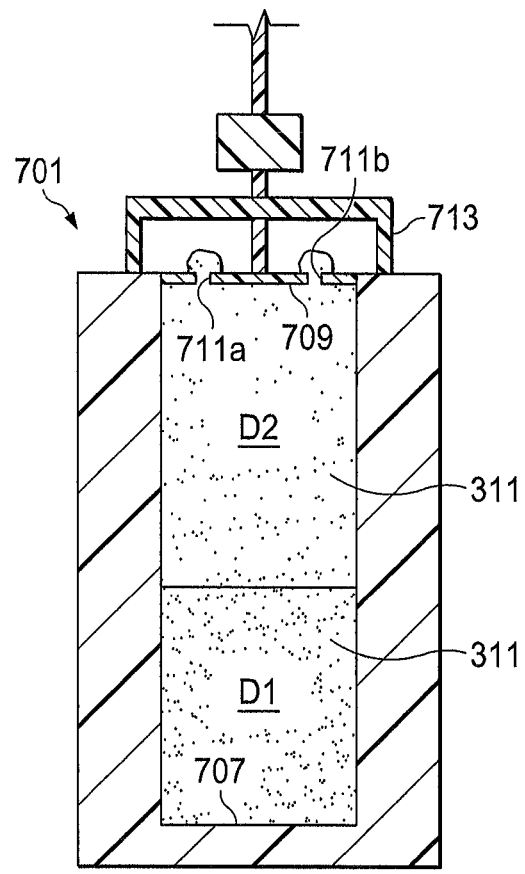

Referring now also to FIGS. 13A and 13B, another embodiment of step 619 includes selectively positioning lid member 709 to create volumes of different densities. For example, a first volume having a density of D1 is created by selectively positioning lid member 709 by a locator tool 713. Locator tool 713 is configured to selectively position lid member 709 as desired position. In the illustrated embodiment, lid member 709 has a single opening 711a in order to produce a density of D1. It should be appreciated that density D1 can also be produced by decreasing the size of openings 711a and 711b. After the first volume having the density D1 has fully expanded and polymerized, then locator tool 713 is repositioned and another batch of foam mixture 807 is introduced so that a second volume is built between the first volume and lid member 709. In the illustrated embodiment, the second volume has a density D2 which is less than density D1 due to the use of both venting openings 711a and 711b. In such an embodiment, the density of foam member 311 can be fully customized in accordance with the predicted loading of foam member 311 in a specific implementation. For example, the inboard portion of elevator 301 may experience higher loading than the outboard portion, as such, it may be desirable for foam member 301 to have a higher density, thus higher strength, near the inboard portion. It should be appreciated that even though FIG. 13B is illustrated with regard to first and second volumes having densities of D1 and D2, step 619 may involve creating any number of volumes having a variety of densities. Further, the number of volumes and densities is implementation specific. For example, if the foam stiffened structure is a large wing on an aircraft, the foam stiffened wing may have a foam member with a dozen different volumes of varying densities.

Figure 14A:
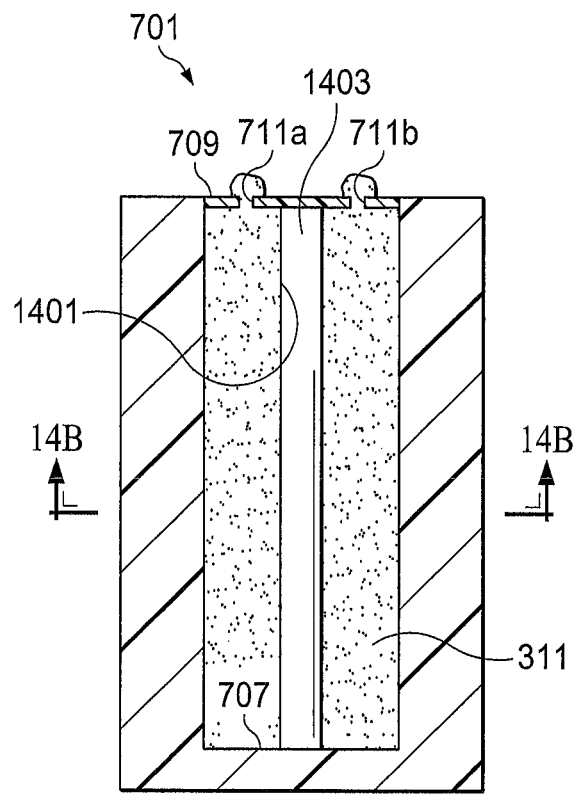
FIG. 14A is a cross-sectional view of an uncured foam member in a mold tool, according to another embodiment of present application.
Figure 14B:
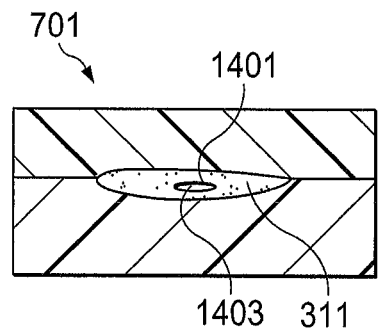
FIG. 14B is a cross-sectional view of an uncured foam member in a mold tool, taken along the section lines 14B-14B, shown in FIG. 14A.

Referring now also to FIGS. 14A and 14B, another embodiment of process 605 includes locating a form 1401 in cavity 707 so as to create a void 1403 in foam member 311. The inclusion of void 1403 in foam member 311 may be particularly desirable for routing wiring, or other system components, through foam member 311. Moreover, void 1403 may also be desirable to reduce the weight of foam member 311. In one embodiment, form 1401 may be a rigid tool that is removed from foam member 311. In another embodiment, form 1401 is a structure that forms a bond with foam member 311 and integral with foam member 311. In such an embodiment, form 1401 acts as a fly-away tool in that form 1401 dictates the geometry of void 1703, and form 1401 also remains with foam member 311. It should be appreciated that the geometry and size of void 1403 is implementation specific and may take on a wide variety of configurations.

Figure 15:
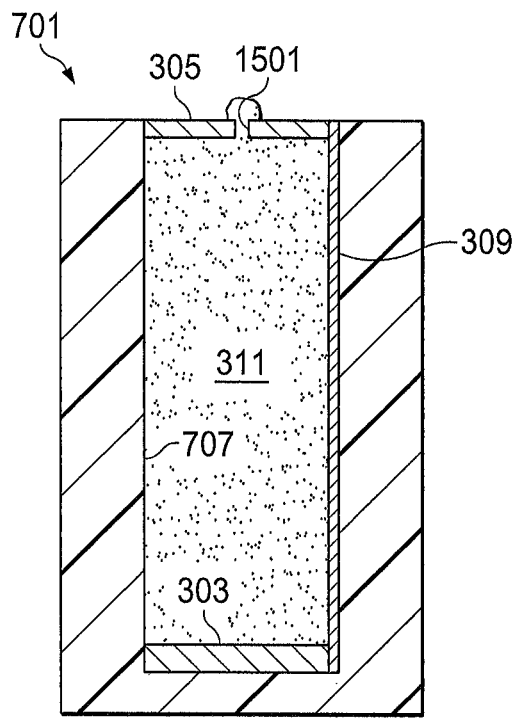
FIG. 15 is a cross-sectional view of an uncured foam member in a mold tool, according to another embodiment of present application.

Referring now also to FIG. 15, another embodiment of process 605 includes incorporating components into cavity 707 of mold 701 so that such components are integral to foam member 311. For example, inboard rib 303, outboard rib 305, and trailing edge member 309 can be located in cavity 707 prior to the introduction of foam mixture 807. As foam mixture 807 expands and polymerizes, foam member 311 becomes integral with inboard rib 303, outboard rib 305, and trailing edge member 309. In such an embodiment, an aperture 1501 in outboard rib 305 is configured to allow the escape of volatiles during expansion of foam mixture 807, similar to vent openings 711a and 711b.

Figure 17A:
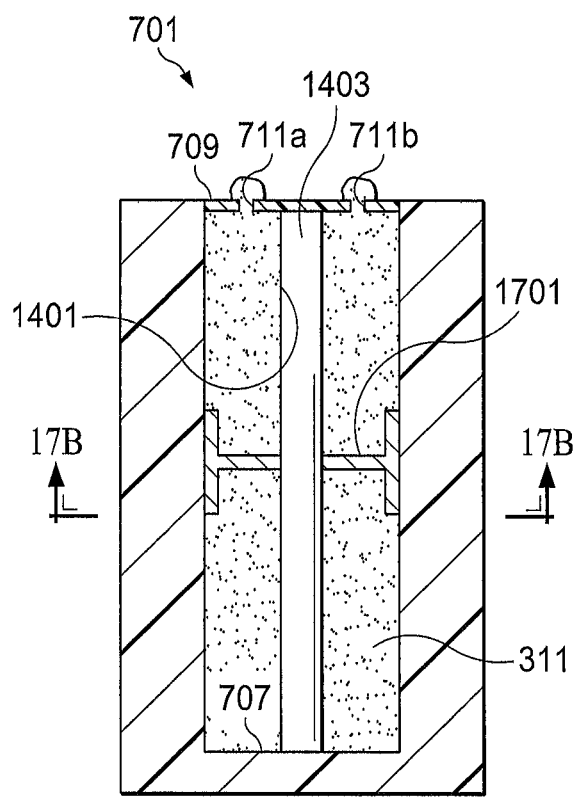
FIG. 17A is a cross-sectional view of an uncured foam member in a mold tool, according to another embodiment of present application.
Figure 17B:
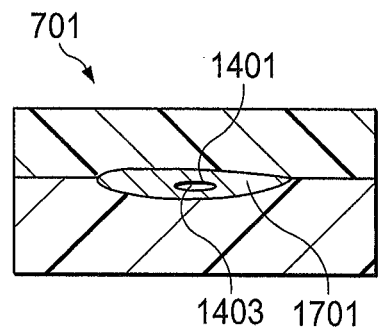
FIG. 17B is a cross-sectional view of an uncured foam member in a mold tool, taken along the section lines 17B-17B, shown in FIG. 17A.

Referring now also to FIGS. 17A and 17B, another embodiment of process 605 includes incorporating a rib 1701 into cavity 707 of mold 701 so that rib 1701 is integral to foam member 311. For example, rib 1701 can be located chord-wise in cavity 707 prior to the introduction of foam mixture 807. In one embodiment, an aperture in rib 1701 functions as a pour opening for foam mixture 807, as well as a vent opening to allow volatiles to escape during expansion of foam mixture 807. However, venting through rib 1701 may be accomplished in a variety of ways, such as through a gap between rib 1701 and form 1401. In such an embodiment, foam member 311 is formed in multiple steps, similar to the procedure described above in regard to FIGS. 13A and 13B. However, in contrast to the lid member 709 shown in FIGS. 13A and 13B, rib 1701 is integral with foam member 311. Rib 1701 can be used to provide supplemental structural support in elevator 301. In the illustrated embodiment, rib 1701 is located approximately mid-span, but it should be appreciated that rib 1701 may be located in a variety of locations along the span of the foam member 311. Further, it should be appreciated that even though FIGS. 17A and 17B are illustrated with form 1401 and void 1403, these are optional features such that some embodiments may not include form 1401 and void 1403. In another alternative embodiment, rib 1701 is introduced after a first part of foam member 311 is formed in mold 701. In such an embodiment, rib 1701 may be "L" shaped in order to facilitate mating of rib 1701 to the first part of foam member 311. It should be appreciated that even though only a single rib 1701 is illustrated, one embodiment includes a plurality of ribs 1701 spaced through foam member 311.

Referring again to FIG. 6B, process 605 continues with a step 621 for curing foam member 311. A full cure of foam member 311 is preferred before foam member 311 is removed from mold 701. The full cure is achieved by first allowing the foam member 311 to remain within mold 701 for at least 24 hours after the expanding of the foam mixture 807 within mold 701. Thereafter, the mold 701, with foam member 311 remaining therein, is cured approximately between 350° F. and 375° F. for approximately two hours. It should be appreciated that alternative foam systems may require different curing requirements. It is preferred that foam member 311 and mold 701 are cooled to 150° F. or below, before demolding. A step 623 includes demolding foam member 311. Demolding foam member includes removing foam member 311 from mold 701. Demolding of foam member 311 may require pliable tools to facilitate separation of the foam member 311 from within cavity 707.

Referring again to FIG. 6A, method 601 continues with a step 607 for applying skin material to foam member 311. Once foam member 311 is removed from mold 701 in step 623 of process 605, then skin material for skin 307 can be applied to foam member 311 in a manufacturing process. The geometry and contours of foam member 307 are accurate to a high tolerance because of being molded in mold tool 703. As such, foam member 311 is configured to act as a "fly-away tool" such that it not only acts as a tooling surface for skin 307 during assembly of elevator 301, but also remains with elevator 301 during operation of the aircraft.

In one embodiment of elevator 301, a structural bond exists between skin 307 and foam member 311 such that shearing loads are transferred between skin 307 and foam member 311 through the structural bond. In such an embodiment, the bond can be formed from the resin in the composite skin. The structural bonding can also be created or supplemented with an adhesive layer located between foam member 311 and skin 307. In an alternative embodiment, a release material may be applied to prevent a structural bond between skin 307 and foam member 311.

Figure 16:
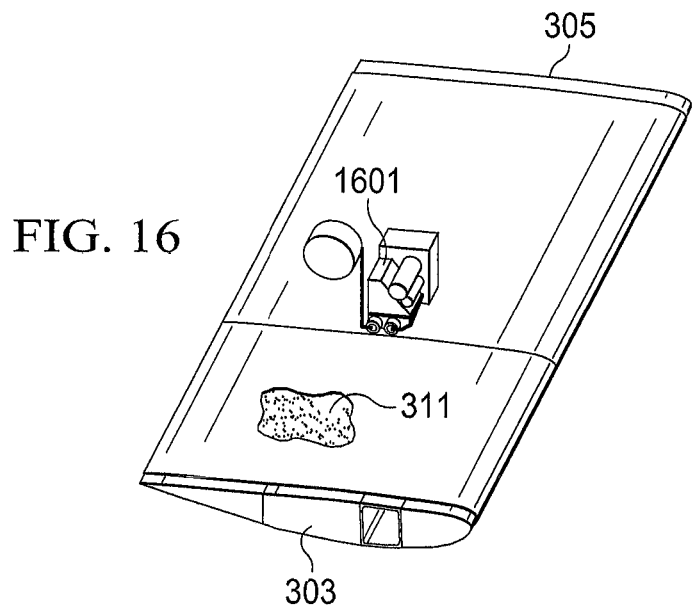
FIG. 16 is a perspective view of a skin being applied to a foam member, according to the preferred embodiment of present application.

In the preferred embodiment, step 607 includes applying uncured composite material onto foam member 311. It should be appreciated that the composite manufacturing process may take on a wide variety of processes because skin 307 may be formed from a wide variety of composite fiber/resin systems, or from metallic materials. Referring now also to FIG. 16, in one exemplary embodiment a fiber placement machine 1601 is used to apply tape strips of composite material in a certain configuration. Alternative embodiments can employ any number of composite manufacturing techniques known in the art. Foam member 311 acts as a tool by dictating the geometry of skin 307. Because foam member 311 was formed in mold 701, the geometry and contours are highly accurate. As such, foam member 311 acts as a high tolerance support of skin 307.

A step 611 of method 601 includes final assembly elevator 301. If inboard rib 303, outboard rib 305, and trailing edge member 309 are not already integrated with foam member 311, then step 611 includes assembling these parts with foam member 311 and skin 307. Step 611 can include assembling any other parts and performing final finish to elevator 301.

Still referring to FIG. 6A, skin 307 is cured in a step 609 of method 601. Skin 307, while on foam member 311, may be vacuum bagged and cured in accordance with one of a variety of conventional composite curing processes. In some embodiments, such as when skin 307 is simply a metal sheet, curing of the skin itself is not required. However, if skin 307 is a metal sheet, an adhesive may be used between the metal sheet and foam member 311, as such; the adhesive may require heat and pressure for curing.

The system of the present application provides significant advantages, including; (1) providing a stiffness producing foam member in a composite structure that can be molded in a variety of geometries and contours; (2) providing a stiffness producing foam member in a composite structure that can withstand autoclave curing pressure; (3) providing a stiffness producing foam member in a composite structure, the density of the foam member being selectively tailored; (4) providing a stiffness producing foam member in a composite structure that provides tooled support for a skin, such that the foam member not only provides structural stiffness, but also a tooling surface for the skin; and (5) providing a stiffness producing foam member in a structure, the foam member having a plurality of volumes of varying densities so that the strength/weight of the foam member is optimized for the predicted loading.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A foam stiffened composite structure, having a predetermined shape, for use in aviation, comprising:
    an outer skin member, comprising a composite fiber material disposed in a polymeric matrix;
    a foam member having multiple zones of varying density with each zone being formed of the same material, the foam member abutting the outer skin member, the foam member having a tooled surface; and
    an inner skin member abutting the foam member, the foam member surrounding the inner skin member;
    wherein the inner skin member is tubular, thereby defining a hollow void space in the interior of the foam member;
    wherein the hollow void space is delimited by the predetermined shape; and
    wherein the outer skin member has the same tooled surface as the tooled surface of the foam member.

2. The structure according to claim 1, wherein the foam member is a cured foam mixture, the foam stiffened composite structure further comprising at least one of:
    a rib attached to the cured foam mixture; and
    a trailing edge member attached to the cured foam mixture.

3. The structure according to claim 1, wherein the inner skin member is fully cured before the foam member abuts the outer skin member and abuts the inner skin member.

4. The structure according to claim 1, wherein the foam member is at least partially cured before the foam member abuts the outer skin member.

\* \* \* \* \*